United States Patent [19]
Beneteau

[11] Patent Number: 5,077,916
[45] Date of Patent: Jan. 7, 1992

[54] SOLE FOR SPORTS OR LEISURE SHOE

[76] Inventor: Charles-Marie Beneteau, Les Bourochelles, 85700 Pouzauges, France

[21] Appl. No.: 673,255

[22] Filed: Mar. 22, 1989

Related U.S. Application Data

[63] Continuation of Ser. No. 458,752, filed as PCT/FR89/00132, Mar. 22, 1989, published as WO89/08996, Oct. 5, 1989, abandoned.

[30] Foreign Application Priority Data

Mar. 22, 1988 [FR] France ................. 88 04054

[51] Int. Cl.⁵ ................. A43B 5/00; A43C 15/16
[52] U.S. Cl. ................. 36/114; 36/31; 36/59 R; 36/128
[58] Field of Search ................. 36/134, 59 R, 59 C, 36/59 A, 31, 128, 126

[56] References Cited

U.S. PATENT DOCUMENTS

| | | | |
|---|---|---|---|
| 1,272,098 | 7/1918 | Reily | 36/59 R |
| 2,930,149 | 5/1960 | Hack et al. | 36/28 |
| 3,559,308 | 9/1969 | Bernier et al. | 36/134 |
| 4,398,357 | 8/1983 | Batra | 36/31 |
| 4,445,288 | 5/1984 | Frör | 36/134 |
| 4,897,936 | 2/1990 | Fuerst | 36/59 R |

Primary Examiner—Paul T. Sewell
Assistant Examiner—Ted Kavanaugh

[57] ABSTRACT

The sole comprises two superposed layers made of different materials: a) a bottom layer (1) of a material which is firm and strong, and provided with projections for bearing against the ground such as studs (13, 14) disposed around the periphery of the sole; and b) a top layer of a material which is flexible and resilient, and which serves as a bearing surface for the user's foot, with said layer carrying flexible projection (20, 21, 22) which project beneath the bottom sole (1) by passing through openings (10, 11, 12) provided therethrough.

9 Claims, 1 Drawing Sheet

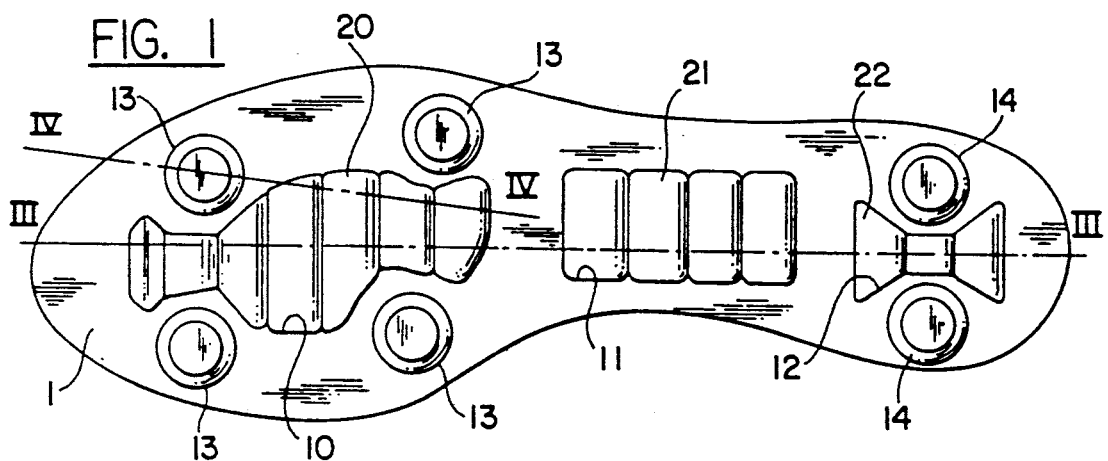
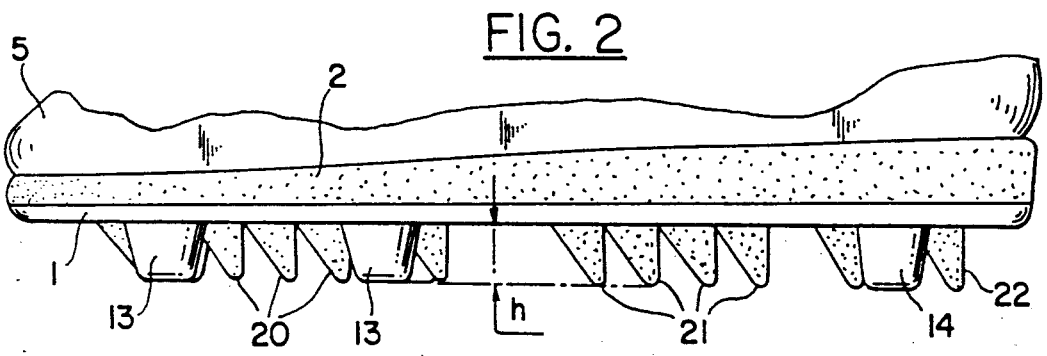
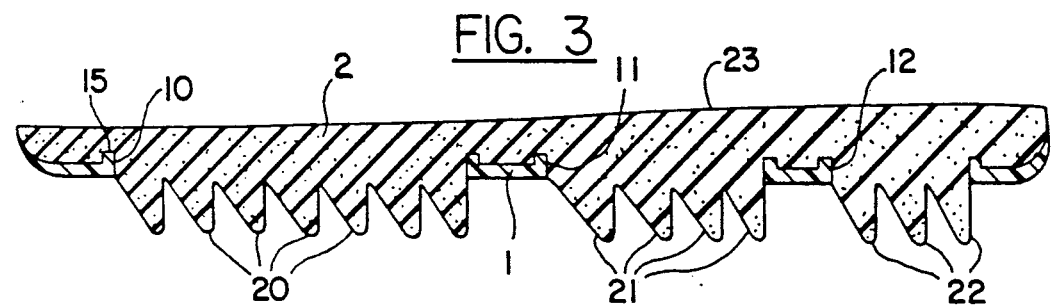
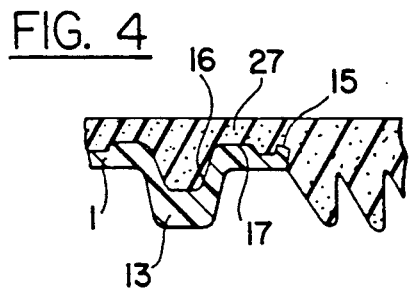
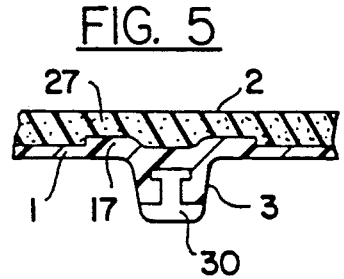
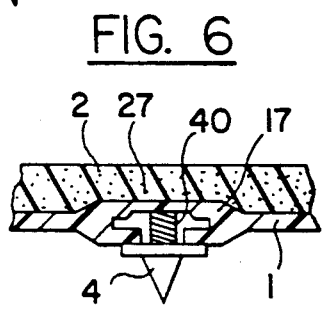

SOLE FOR SPORTS OR LEISURE SHOE

This is a continuation of co-pending application Ser. No. 458,752 filed as PCT/FR89/00132, Mar. 22, 1989, published as WO89/08996, Oct. 5, 1989, now abandoned.

The present invention relates to a sole for a sports or leisure shoe, i.e. an (outer) sole for a shoe designed for participating in a sport or analogous activity in the open air.

Numerous sporting activities, for example such as association football, Rugby football, athletics, baseball, cricket, running races, rambling, etc. give rise to forces of various configurations and amplitudes on the feet, and require the use of special shoes whose soles must satisfy the following three requirements:
a) effective grip on the ground in order to avoid or reduce the risk of slipping;
b) an extended bearing area on the ground in order to absorb shock and to restore the energy absorbed at the moment of impact; and
c) great lightness in order to avoid the tiring effect of the load represented by the weight of a shoe.

In order to solve the problem of grip on the ground, it is well known that the underside of the sole may be provided with projections such as studs, strips, or spikes of various shapes, sizes, and dispositions. These projections and the sole which supports them are naturally subjected to high levels of stress and consequently they must be particularly good at withstanding abrasion and the various mechanical shear and bending forces to which they are subjected. They are thus generally solid and not very light.

In order to improve user comfort, it is also known to provide a sole built up from two layers, namely a top layer serving as a bearing surface for the foot of the user and made of a material which is flexible and resilient, and a bottom layer made of a material which is firm and which withstands abrasion, with the bottom surface therefore carrying the anti-slip projections. A sole of this type in which the projections are in the form of transverse strips, is described in patent document FR-A-2 374 863, for example.

A sole of this type is relatively effective on heavy ground, but suffers from considerable drawbacks on dry ground and on pliant ground, and these states depend not only on the weather and the season, but also on the progress made in modern techniques for constructing sports grounds, which make them less sensitive to climatic variation. In these cases, which are becoming more and more frequent, the projections give rise to an inadequate and uneven bearing surface on the ground, thereby causing hard points to appear beneath the sole of the foot, with poor shock absorption and with little of the energy absorbed on impact being returned, thereby causing such a sole to be a source of discomfort, of fatigue, and of accidents to the muscles.

That is why the invention seeks to provide a lightweight sole capable of providing both an effective grip and an extended bearing surface so as to obtain substantially the same effect as a sole provided with projections so far as grip is concerned, and as a sole without projections so far as bearing surface on the ground is concerned, while simultaneously being comfortable and capable of absorbing shock and restoring energy, regardless of ground state.

To this end, the sole of the present invention is a sole of the type comprising two superposed layers, namely a bottom layer made of a firm material that withstands abrasion and whose bottom face is provided with projections for bearing against the ground, and a top layer made of a material which is flexible and resilient and whose top face serves as a bearing surface for the foot of the user, the sole being characterized in that said projections are distributed around a peripheral zone of the sole, and in that the bottom layer has at least one opening disposed in a central zone thereof, said top layer being itself provided with flexible projections for bearing against the ground, which projections go through said opening in order to project beneath the bottom layer.

This sole is thus characterized by the presence of two sorts of projection, projections which are firm and rigid, somewhat of the traditional type, and additional, flexible projections which provide assistance to the "traditional" projections. The flexible projections are easily deformable in compression, by virtue in particular of their structure and of the nature of the material from which they are made, and consequently they tend to retract relative to the firm projections by compressing as a function of the pressures exerted upon them.

In addition, according to various advantageous (but not limiting) characteristics of the invention:

the material constituting the top layer is an expanded material, e.g. expanded polyurethane;

a series of flexible projections are provided at least in the middle zone of the front of the foot and in the heel zone;

a series of flexible projections is also provided in the zone of the arch of the foot;

the projections provided on said bottom layer are of substantially the same height as the flexible projections provided on the said top layer;

the flexible projections are transverse jagged folds, which preferably constitute integral portions of the sole;

the thickness of the top layer increases progressively from the toe to the heel;

the top face of the bottom layer is smooth;

the projections on said bottom layer are hollow studs, with their hollows being filled with the flexible material constituting the said top layer; and the said bottom layer has reinforcing portions of increased thickness in the vicinity of its projections, which portions are compensated by thickness reductions in the overlying top layer.

Other characteristics and advantages of the invention appear from the following description and from the accompanying drawing which shows a preferred embodiment.

In the drawing:

FIG. 1 is a view of the underside of the sole;

FIG. 2 is a profile view of the sole shown in FIG. 1;

FIG. 3 is a section through the FIG. 1 sole on a longitudinal vertical plane III—III;

FIG. 4 is a fragmentary section showing a portion of the sole on a plane IV—IV; and FIGS. 5 and 6 are detail views likewise in section showing possible variants of the firm projections provided on the bottom layer.

The sole shown in FIGS. 1 to 4 is an outdoor sole essentially constituted by two superposed layers of mutually compatible different materials, namely a top layer 2 and a bottom layer 1. A portion of the upper of the shoe fitted with this sole is referenced 5 in FIG. 2. The term "compatible" is used to mean that the two layers are capable of being welded to each other both thoroughly and durably so that after they have been assembled they can be separated only by being torn apart.

The outline of the bottom layer 1 corresponds to the outline of a sole for a traditional shoe. The bottom layer is made of a relatively hard material, e.g. compact polyurethane or high strength rubber. The specific gravity of this material may be about 0.9 to 1.25, for example. The bottom face of the layer 1 carries a plurality of anti-slip projections which, in the example shown, are studs that are generally frustoconical in shape. These studs are disposed solely around the peripheral zone of the sole. Thus, four studs 13 are provided in the peripheral zone for the front of the foot, and two lateral studs 14 are provided in the heel zone. In well-known manner, the studs 13 and 14 constitute integral portions of the layer 1, with the assembly being obtained by injection molding.

The outline of the top layer 2 is likewise footprint-shaped and is superposed on the layer 1. The top layer is made of a flexible and resilient lightweight, material, e.g. expanded polyurethane, having a specific gravity of about 0.40 to 0.70.

The shoe is advantageously manufactured by initially molding the compact layer 1, optionally with inserts made of metal or other material being included therein, e.g. inserts made of compact polyurethane or a similar material; said layer 1 then being placed in a mold while the upper is placed in conventional manner on a cast which is moved towards the mold so as to close it; finally, the layer 2, e.g. of expanded polyurethane, is injected between the upper and the layer 1, thereby connecting together the assembly by overmolding. The density of the expanded material may be less than one half the density of the compact material while still retaining excellent qualities of binding, resilience, and resistance to tearing.

Manufacture may also take place in a single operation by performing two simultaneous injections using a machine having two injector heads.

According to an essential characteristic of the invention, the bottom layer 1 has at least one opening provided in a middle zone (disposed inwards relative to the peripheral positions of the projections 13 and 14). In the embodiment shown, three openings 10, 11, and 12 are provided situated respectively in the middle of the zone at the front of the foot (between the front studs 13), in the zone of the arch of the foot, and in the middle of the heel zone (between the two rear studs 14).

The thickness of the top layer 2 of flexible and resilient material increases slightly and progressively from the toe towards the heel of the sole, thereby obtaining a natural position for the foot and increasing the shock absorbing capacity of the sole at the heel. The top face 23 of the layer 2 is smooth and substantially plane. In contrast, its bottom face has three series of projections 20, 21, and 22 having the same outlines as the openings 10, 11, and 12, respectively, and situated to correspond with said openings. These projections which are molded integrally with the remainder of the layer 2 are in the form of folds constituting indentations running transversely relative to the longitudinal axis of the shoe. These indentations are substantially triangular in cross section, which shape combines good flexibility (by the indentation deforming in bending) with good capacity for gripping the ground. Indentations of this type are known per se and are described, for example, in patent document U.S. Pat. No. 2,930,149.

After the two layers 1 and 2 constituting the sole have been assembled, the projections 20, 21, and 22 pass through the openings 10, 11, and 12 respectively so as to project beneath the bottom face of the bottom layer 1. They are preferably of such a length as to project over a height h which is substantially the same as the height of the studs 13 and 14.

The edges of the openings 10, 11, and 12 are advantageously thicker than the remainder of the layer 1, with these edges 15 thus constituting reinforcement of the sole to compensate for the weakening due to the presence of the openings.

As can be seen in FIG. 4, the studs 13 and 14 have internal hollows 16 occupied by the flexible material which constitutes the layer 2. It will also be observed that in the vicinity of the studs 13 and 14, the layer 1 has extra reinforcing thickness 17. This is compensated by a reduction in the thickness of the region 27 of the top layer lying thereover, such that the planeness of the top face 23 of the sole remains uneffected.

The top layer 2 made of lightweight expanded material serves firstly to provide bonding with the upper, and secondly to provide the user with a comfortable cushion running beneath the entire surface of the foot, absorbing shock and restoring energy under good conditions at the most appropriate locations, i.e. mostly in the middle of the front of the foot and in the middle of the heel, and also beneath the arch of the foot.

Naturally, an inner sole of conventional type is provided inside the shoe such that the foot bears against the top layer 2 via said inner sole.

The compact bottom layer having higher resistance to abrasion, to breaking, and to shear forces, ensures that the sole is firm and that it grips the ground well via the studs 13 and 14.

When engaging in a sporting or physical activity out of doors, the sole is subjected to different kinds of stresses depending on the nature of the ground.

In very soft ground, both the firm projections and the flexible projections penetrate into the ground without difficulty such that all of them contribute to both the function of providing bearing area and to the anti-slip function. The large number and aggressive shape of the sets of projections 20, 21, and 22 provide very substantial additional grip for the anti-slip function.

On pliant ground, which is ideal for sporting activity, a perfectly complementary situation develops between gripping the ground and distributing bearing forces over the sole of the foot.

On ground which is dry and hard, the flexible projections provide more of a bearing function, with increased shock absorption and energy restoration. Since the flexible projections bear against the ground, they limit transverse deformation of the sole by sagging of its middle portion, which middle portion is so-to-speak suspended between the firm peripheral projections which cannot penetrate easily into ground which is too hard.

The sole of the invention thus provides solutions to the problem mentioned above which arises when performing a sporting activity on various different types of ground.

Without going beyond the scope of the invention, it is possible to provide the flexible projections and the firm projections with shapes and dispositions that are different from those described above with reference to FIGS. 1 to 4, for example they may be in the form of strips, points, spikes, etc.

The flexible projections may be identical in shape to the firm projections, or on the contrary, they may be different in shape.

In the variant shown in FIG. 5, a stud 3 is provided with a part 30 suitable for being worn away, e.g. made of metal. This part may be constituted by an insert over which the sole is molded, or alternatively it may constitute a removeable part.

In the variant shown in FIG. 6, the bottom layer 1 is provided with inserts 40 in the form of threaded rods, on which projections such as conical spikes 4 are screwed.

The shape and number of firm projections and/or of flexible projections are naturally selected as a function of the sport for which the shoe is intended.

The two layers 1 and 2 may be made of materials having different colors, thereby obtaining soles which are two-toned, both underneath and on the sides.

By increasing or reducing the density of the expanded material constituting the top layer 2, it is possible to use the same mold to provide different soles which are more particularly suitable for ground which is dry or ground which is wet, i.e. suitable for countries having different climatic conditions.

What is claimed is:

1. A sole for a shoe, the sole being of the type comprising two superposed layers (1, 2), namely a bottom layer (1) made of a firm material that withstands abrasion and whose bottom face is provided with integrally formed rigid projections (13, 14) for bearing against relatively soft surfaces, and a top layer (2) made of a material which is flexible and resilient and whose top face (23) serves as a bearing surface for the foot of the user, the sole being characterized by a front zone associated with the ball of the foot, and a rear zone associated with the heel of the foot, and said sole front zone having a central region, said rigid projections (13) arranged in peripherally spaced relationship around said central region of said front zone of the sole, said bottom layer (1) having at least one opening (10), disposed in said central region of said front zone of said sole, said top layer (2) provided with integrally formed flexible projections (20, 21, 22) of substantially the same height (h) as said rigid projections for gripping hard surfaces, which flexible projections go through said opening (10), in order to project beneath the bottom layer (1), said flexible projections being readily deformable, and said peripherally spaced rigid projections being not easily deformable, said central region of said sole front zone being free of rigid projections.

2. A sole according to claim 1, wherein said rear zone also has relatively rigid projections (14) distributed peripherally around a central heel region, and flexible projections in said top layer provided in an opening (12) of said bottom layer in said central heel region so as to project beneath said bottom layer, said rigid and flexible projections of said rear zone being similarly to those of said front zone, and said central heel region being free of rigid projections.

3. A sole according to claim 1, characterized in that said flexible projections comprises transversely rib-like oriented generally triangular projections, the pointed apex of each of said triangular projections adapted to yieldably engage the ground for improved traction on smooth hard surfaces, said peripherally spaced rigid projections in said bottom layer comprising studs of generally frusto-conical configuration for improved traction on soft irregular surfaces.

4. A sole according to claim 1, characterized in that the material constituting the top layer is expanded polyurethane.

5. A sole according to claim 1, characterized in that the thickness of the top layer (2) increases progressively from the toe to the heel.

6. A sole according to claim 1, characterized in that the top face (23) of the top layer (2) is smooth.

7. A sole according to claim 1, characterized in that the projections (13, 14) on said bottom layer (1) are hollow studs, with their hollows (16) being filled with the flexible material constituting the said top layer (2).

8. A sole according to claim 1, characterized in that the said bottom layer (1) has reinforcing portions of increased thickness (17) in the vicinity of its projections (13, 14; 3, 4), which portions are compensated by thickness reductions (27) in the overlying top layer (2).

9. A shoe for sports or leisure, provided with a sole according to any one of claims 1 to 6.

* * * * *